United States Patent [19]

Leis

[11] Patent Number: 5,406,251
[45] Date of Patent: * Apr. 11, 1995

[54] AIR OPERATED PIVOTING SAFETY APPARATUS FOR VEHICLE

[76] Inventor: Kenneth Leis, 1121 Brynllawn Rd., Villanova, Pa. 19085

[*] Notice: The portion of the term of this patent subsequent to Nov. 24, 2009 has been disclaimed.

[21] Appl. No.: 35,997

[22] Filed: Mar. 23, 1993

[51] Int. Cl.⁶ .................................. B60Q 1/26
[52] U.S. Cl. ........................ 340/433; 340/487; 180/281; 116/39
[58] Field of Search ............ 340/433, 487, 468, 488, 340/489; 180/281; 116/39, 28 R; 40/477, 479

[56] References Cited

U.S. PATENT DOCUMENTS

| | | | |
|---|---|---|---|
| 1,281,137 | 10/1918 | Cole . | |
| 2,006,654 | 7/1935 | Roan | 116/54 |
| 2,252,529 | 8/1941 | Simpkins et al. | 116/39 |
| 3,755,936 | 9/1973 | Terre et al. | 40/33 |
| 4,021,946 | 5/1977 | Bradshaw | 40/33 |
| 4,138,668 | 2/1979 | Latta, Jr. et al. | 340/130 |
| 4,319,170 | 3/1982 | Brent | 318/376 |
| 4,339,744 | 7/1982 | Latta, Jr. | 340/133 |
| 4,379,985 | 4/1983 | Coppola | 318/293 |
| 4,527,103 | 7/1985 | Kade | 318/293 |
| 4,559,518 | 12/1985 | Latta, Jr. | 340/130 |
| 4,766,413 | 8/1988 | Reavell | 340/130 |
| 4,816,804 | 3/1989 | Reavell | 340/433 |
| 4,916,372 | 4/1990 | Reavell et al. | 318/437 |
| 4,956,630 | 9/1990 | Wicker | 340/433 |
| 5,036,307 | 7/1991 | Reavell et al. | 340/433 |
| 5,132,662 | 7/1992 | Burch | 340/433 |
| 5,166,663 | 11/1992 | Leis | 340/433 |
| 5,199,754 | 4/1993 | Freeman | 340/433 |
| 5,226,686 | 7/1993 | Triggs et al. | 340/433 |
| 5,281,948 | 1/1994 | Estrada | 340/433 |

Primary Examiner—John K. Peng
Assistant Examiner—Nina Tong
Attorney, Agent, or Firm—Panitch Schwarze Jacobs & Nadel

[57] ABSTRACT

A pivoting safety apparatus is adapted for mounting on a motor vehicle. The safety apparatus comprises a housing for mounting on the motor vehicle and a safety device pivotally coupled with the housing for movement about an axis between a retracted position and an extended position. An actuator at least partially located within the housing is comprised of an air cylinder having a piston arm extending from a piston and coupled to the safety device for movement of the safety device about the pivot axis in response to variations from atmospheric pressure of air within the air cylinder. An air pressure adjuster comprised of an electrically powered air compressor, a fluid coupling extending between the air compressor and the air cylinder, and an electrically operated valve is employed for altering the air pressure within the air cylinder to move the piston, the piston arm, and the safety device. In a preferred embodiment, a pressure sensor senses the pressure within the air pressure adjuster and causes the air compressor to stop operating when a predetermined pressure is sensed.

20 Claims, 3 Drawing Sheets

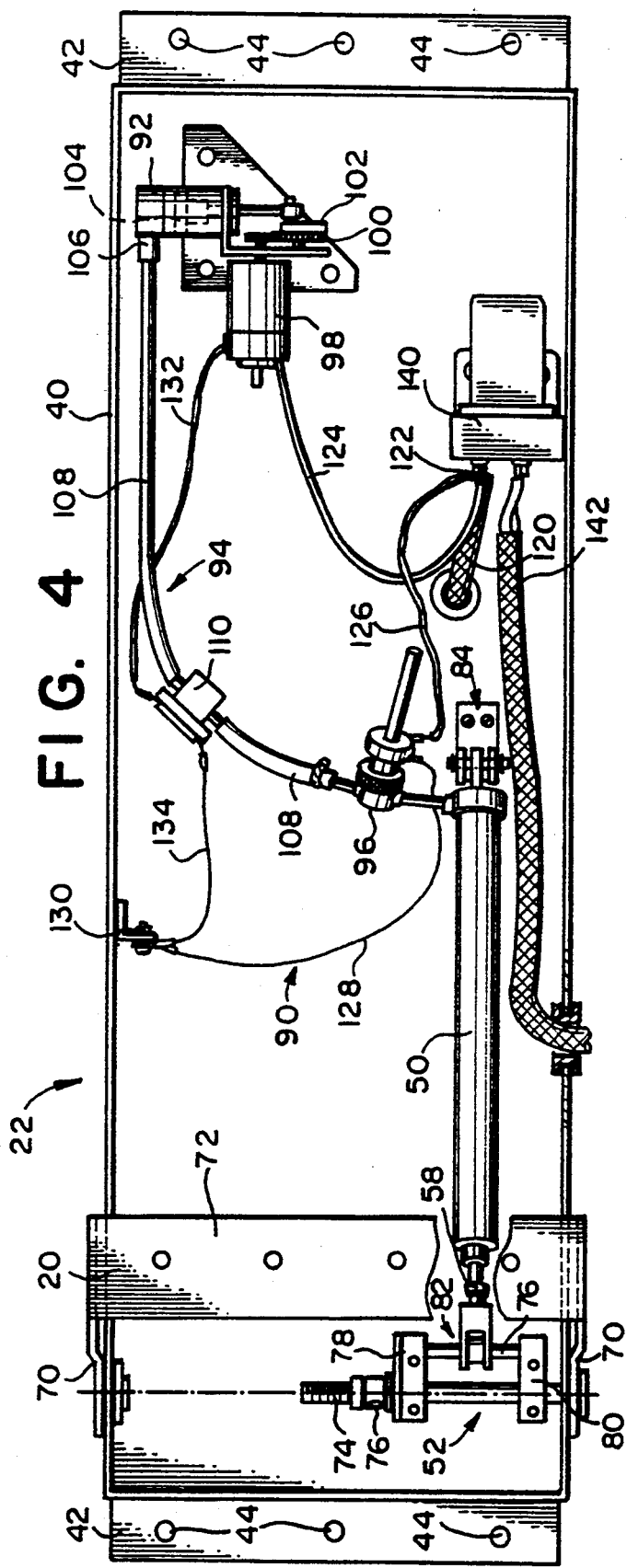

AIR OPERATED PIVOTING SAFETY APPARATUS FOR VEHICLE

BACKGROUND OF THE INVENTION

This invention is directed to an air operated pivoting safety apparatus, such as a safety gate, for use on a vehicle such as a school bus, which can be mounted to the vehicle as original equipment or as an aftermarket accessory.

FIELD OF THE INVENTION

Driven stop signs for school buses and the like have been known for many years. U.S. Pat. No. 2,252,529 describes a vacuum actuated sign mechanism in use since the 1930's. The sign is normally held against the side of the bus by a spring retainer. When a control valve is opened, vacuum provided by the vehicle pulls in a diaphragm which overrides the spring retainer and causes the stop sign to swing out about a vertical axis. Appropriate circuitry connected to a vacuum valve plunger also activates blinking lights on the sign and on the front and back of the bus. However, the sign itself is deployed solely by the vacuum system. Closing of the valve causes the diaphragm to return to its normal position and the sign to return to the side of the bus. This system requires a large vacuum source tank on the vehicle and a network of tubing from the engine intake manifold, supplying the vacuum to the tank, and from the tank to the mechanism on the side of the bus. Such tubing is typically made of metal for longevity and is expensive to purchase and install. A rupture or even a small leak anywhere along the tubing or at any of the seals or joints renders the system inoperative. The neoprene diaphragm itself can develop air leaks as a result of aging and apparently requires a significant amount of time for removal and replacement when it fails.

In more recent years, electric motor-driven stop sign devices and safety gates have supplanted vacuum-operated devices for most school buses and the like. Electric motor-driven devices of this type are disclosed, for example, in U.S. Pat. Nos. 4,138,668; 4,766,413; and 4,956,630. The devices disclosed in each of these patents include a generally rectangular housing which may be bolted or otherwise secured to an outer surface of a bus or like vehicle. A stop sign or safety gate is pivotally mounted by means of a bracket pivotally coupled with the housing. Both unidirectional and reversible electric motors have been disclosed for pivoting the stop sign or safety gate. Generally speaking, the unidirectional electric motors are cheaper to purchase and easier to regulate, but require more complicated mechanical linkages to provide reciprocating action to the sign or gate. Reversible electric motors are more expensive and usually require more complicated controls to provide separate or reverse currents. However, they permit the direct coupling or nearly direct coupling of the motor directly to the pivotable bracket supporting the sign or gate.

In addition to the foregoing, some driven pivoting sign devices are reported to employ compressed-air systems for use on buses and other vehicles having an air compressor, which is typically provided for air brakes. It is believed existing compressed air operated devices suffer from the same infirmities suffered by conventional, vacuum-operated systems.

U.S. Pat. No. 5,166,663 discloses an electrically-operated, air driven pivotal sign device which overcomes many of the deficiencies of the prior art. More specifically, the sign device disclosed in U.S. Pat. No. 5,166,663 takes advantage of the operational simplicity of an air operated pivoting sign by employing, within the device, an air compressor so there is no need to use the compressed air system from the vehicle's braking system or the like and, therefore, no need for the tubing and valving associated with prior art air operated devices. The actuator disclosed in U.S. Pat. No. 5,166,663 provides single wire operation in that the entire operation of the device is controlled by applying a single voltage pulse of the desired duration over a single wire extending from the vehicle to the device. Thus, it is a relatively simple matter to install the device on a new or existing vehicle.

The present invention comprises an improvement over the device disclosed in U.S. Pat. No. 5,166,663 which makes the device less mechanically complex and more economical to produce. In addition, the present invention relates to an actuator for any type of pivotal safety device including a sign, a gate, or the like.

SUMMARY OF THE INVENTION

Briefly stated, the present invention comprises a pivoting safety apparatus for mounting on a vehicle. The safety apparatus comprises a housing and a safety device pivotally coupled with the housing for movement about an axis between a retracted position and an extended position. An actuator at least partially located within the housing comprises an air cylinder having a piston arm extending from a piston within the air cylinder and coupled to the safety device for movement of the safety device about the pivot axis, the piston arm and the piston being movable in response to variations from atmospheric pressure of air within the air cylinder. An air pressure adjustment means comprises an electrically powered air compressor, a fluid coupling extending between the air compressor and the air cylinder, and an electrically operated valve. The valve and the air compressor are wired together so that the application of a single electrical signal causes the air compressor to operate and the valve to actuate for altering the air pressure within the air cylinder from atmospheric pressure to move the piston and piston arm and to pivot the safety device from the retracted position to the extended position. A pressure sensor is provided for sensing the air pressure within the air pressure adjustment means and for causing the air compressor to stop operating when a predetermined pressure is sensed. The safety device may comprise a sign, a gate, or the like.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 4 is an elevational view, partially broken away, of the housing shown in FIG. 2 with the cover removed;

FIG. 5 is a sectional view, partially broken away, of the air cylinder of FIG. 4;

DETAILED DESCRIPTION OF PREFERRED EMBODIMENTS

Figure 1:
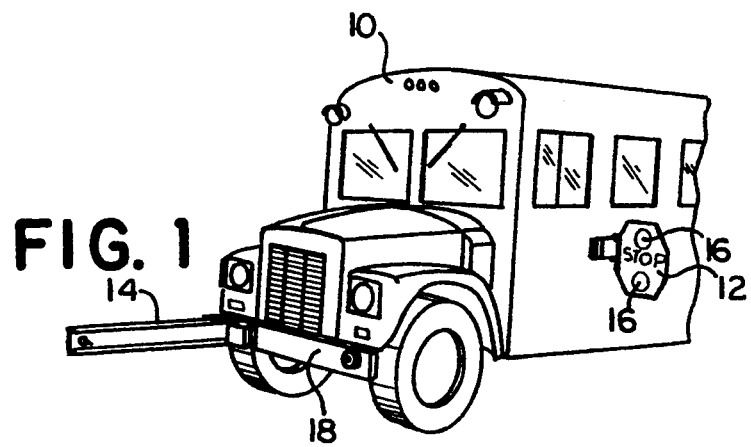
FIG. 1 is a perspective view of a school bus illustrating the operation of the present invention in connection with a pivoting stop sign and a pivoting gate.

Referring to the drawings, wherein like reference numerals are employed for indicating like elements throughout the several figures, there is shown in FIG. 1 a perspective view of a vehicle such as a school bus 10 employing pivoting safety apparatus in accordance with the present invention. The safety apparatus employed on the school bus 10 includes a first safety device, in the present embodiment a pivoting generally octagonal stop sign 12 and a second safety device, in the present embodiment a pivoting elongated gate member 14. The stop sign 12 is of a type generally well known in the art and includes a pair of electrically operated indicator lights 16 which preferably flash on and off when the stop sign 12 is moved or pivoted approximately 90° about a pivot axis to an extended position in which the stop sign 12 extends generally perpendicular to the side of the bus 10 as illustrated in FIG. 1. Further details concerning the structure of the stop sign may be obtained by referring to U.S. Pat. No. 5,166,663, the disclosure of which is hereby incorporated herein by reference.

The gate member 14 is employed for the purpose of preventing persons, particularly children, from passing too close to the front of the school bus 10 for clear observation by the driver. The gate member 14 is movable or pivotable from a retracted position (not shown in FIG. 1) in which the gate member 14 extends generally parallel to the front bumper 18 of the school bus 10 and an extended position as shown in FIG. 1 in which the gate member 14 extends generally perpendicular to the bumper 18. In the extended position, persons may only pass in front of the school bus 10 by going around the end of the gate member 14.

Figure 2:
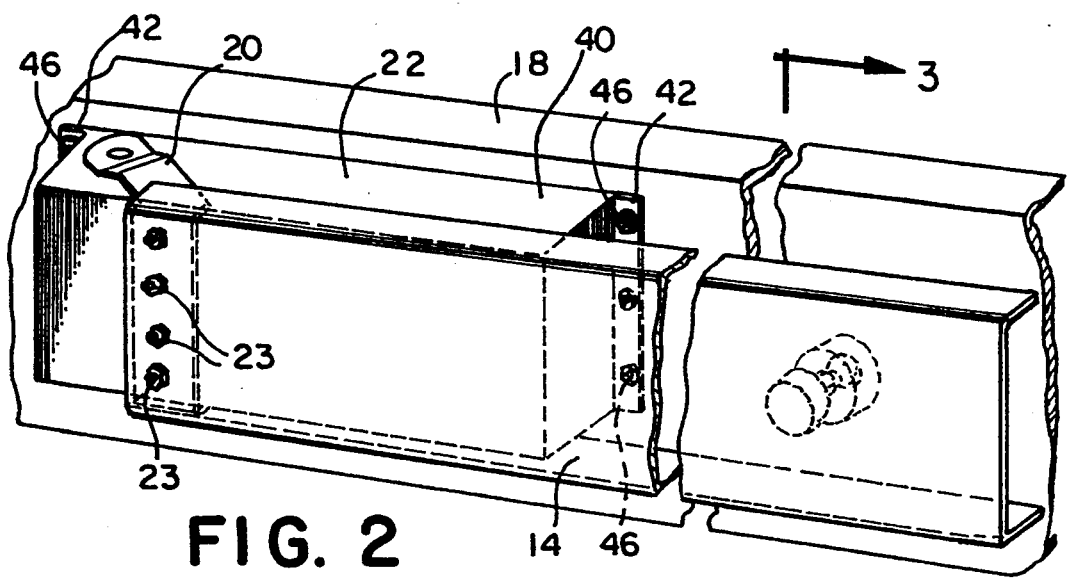
FIG. 2 is an enlarged perspective view, partially broken away, of the pivoting gate shown in FIG. 1.
Figure 3:
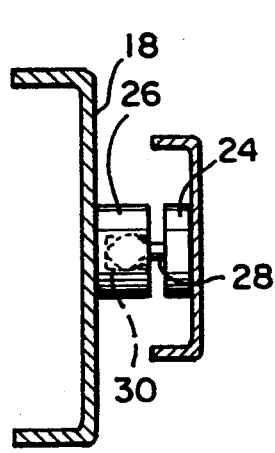
FIG. 3 is a sectional view of a portion of the gate taken along line 3—3 of FIG. 2.

The gate member 14, in the present embodiment, is comprised of an elongated channel which, as illustrated in FIGS. 2 and 3, is generally U-shaped in cross-section with the legs of the U extending toward the school bus bumper 18 and the cross member of the U being generally parallel to the bumper 18 when in the retracted position. The gate member 14 is preferably made of a lightweight high-strength material such as aluminum, steel, or a high-impact plastic material. It will be appreciated by those skilled in the art that the length and cross-sectional shape of the gate member, as well as the material from which the gate member is formed, may differ from application to application and, therefore, the present invention is not limited to a gate member 14 having a particular shape, length, or structure.

As best shown in FIG. 2, a first end of the gate member 14 is attached to a pivoting bracket member 20 associated with an actuator 22 which will hereinafter be described in greater detail. In the illustrated embodiment, the first end of the gate member 14 is secured to the bracket member 20 utilizing standard hardware such as a plurality of nuts and bolts 23 although it will be apparent to those skilled in the art that welding or brasing, clamping, crimping, an adhesive or any other such fastening means may be employed in the alternative.

An engagement means is provided proximate the other end of the gate member 14 for removably engaging with the vehicle bumper 18 to provide support for the other end of the gate member 14 when in the retracted position. In the presently preferred embodiment, the engagement means comprises a first coupling member 24 secured to the gate member 14 and a second, complementary coupling member 26 secured to the vehicle bumper 18. As best shown in FIG. 3, the first coupling member includes a generally outwardly extending lug portion 28 and the second coupling member 26 includes a suitably sized opening 30 adapted to receive and hold the lug member 28 when the gate member 14 is in the retracted position. Preferably, the opening 30 in the second coupling member 26 includes a suitable spring or other detent device (not shown) to removably secure together the first and second coupling members 24, 26. It will, of course, be appreciated by those skilled in the art that any other suitable type of coupling members may be employed in the alternative. For example, each of the coupling members may comprise magnets having opposite poles facing each other.

Typically, when the school bus 10 is moving, both the stop sign 12 and the gate member 14 are in their retracted positions (not shown) in which the stop sign 12 is generally parallel to the side of the school bus 10 and the gate member 14 is generally parallel to the bumper 18 with the first and second coupling members 24, 26 interengaged. When the school bus 10 is stopped for the purpose of loading or discharging passengers, both the stop sign 12 and the gate member 14 are moved or pivoted to their extended positions as shown in FIG. 1. In its extended position, the stop sign 12 is generally perpendicular to the side of the school bus 10 and the lights 16 are flashed on and off in a predetermined manner to provide a clear visual warning to passing vehicles. In its extended position, the gate member 14 effectively blocks persons from passing close to the front of the school bus 10. Once all passengers have been loaded onto or discharged from the school bus 10, the stop sign 12 and the gate member 14 are pivoted back to their retracted positions and the school bus 10 continues along its route.

The foregoing provides a general description of the structure and operation of two safety devices; namely, a stop sign 12 and a gate member 14 which may be employed on a motor vehicle such as a school bus 10. It will be appreciated by those skilled in the art that additional safety devices, such as additional signs or additional gate members may be employed in connection with another type of vehicle, and that other types of safety devices may be employed in the alternative. Thus, the present invention is not limited to any particular type of safety device or any particular type of vehicle.

The following description relates to the structure and operation of the actuator 22 which is employed for moving or pivoting the stop sign 12, the gate member 14, or any other type of safety device between a retracted position and an extended position. For the sake of brevity, only a single actuator 22 as employed in connection with the gate member 14 will be described. It should, however, be clearly understood that the actuator 22 as described below may be employed with the stop sign 12 or with any other type of safety device.

As best shown in FIGS. 2 and 4, the actuator 22 includes a generally rectangular box-like housing 40 having a generally flat rear surface and laterally outwardly extending flanges 42 on each end for mounting the housing 40 to the school bus bumper 18. Each of the flanges 42 includes a plurality of holes 44 extending therethrough to facilitate attachment to the vehicle bumper 18 utilizing nuts and bolts 46 or any other suitable type of fastener. Further details concerning the structure of the housing 40 may be obtained by reference to U.S. Pat. No. 5,166,663.

FIG. 4 depicts the preferred internal components of the actuator 22. The actuator 22 generally comprises an air cylinder 50 and suitable connecting linkage shown generally as 52 for interconnecting the air cylinder 50 and the pivotable bracket member 20 in a manner which will hereinafter be described in greater detail. The air cylinder 50 may be obtained from a variety of manufacturers and may be, for example, a Model 185-1 Minimatic Air Cylinder made by Clippard Instrument Laboratory, Inc., Cincinnati, Ohio. Referring to FIG. 5, the preferred air cylinder 50 includes a generally tubular housing 54, a generally cylindrical piston 56 mounted for linear reciprocation through the housing 54, a piston rod or arm 58 fixedly coupled to one side (the left side on FIG. 5) of the piston 56 and extending through an end wall of the housing 54 and a compression coil return spring 60 positioned between the left or rod side of the piston 56 and the end wall of the housing 54 and surrounding the portion of the piston arm 58 within the housing 54. Suitable O-ring type seals 62 are provided and a fluid coupling 64 is employed to permit compressed air or other pressurized fluid to be fed into or removed from the housing 54 on the head side of the piston 56. It will be appreciated by those skilled in the art that the return spring 60 is positioned to resist movement of the piston 56 toward the left when air pressure in the housing 56 is varied from atmospheric level by the supply of compressed air or other fluid through the coupling 64. Of course, once the bias of the spring 60 has been overcome by the application of sufficient compressed air or other fluid supplied to the head side of the piston 56 through the coupling 54, the piston 56 translates to the left when viewing FIG. 5 against the bias of the return spring 60. When the air or other fluid pressure is reduced, the bias of the return spring 60 pushes the piston 56 toward the right to the position shown in FIG. 5. Movement of the piston 56 in either direction results in corresponding movement of the piston arm 58.

Referring again to FIG. 4, the connecting linkage 52 between the air cylinder 50 and the pivoting bracket member 20 is shown. The pivoting bracket member 20 is generally U-shaped and includes upper and lower generally parallel arms 70 extending from opposite ends of a generally vertically extending cross-member portion 72 to which the first end of the gate member 14 is secured (FIG. 2). The arms 70 overlap the upper and lower walls of the housing 40 so that the bracket member 20 may freely pivot with respect to the housing 40. Preferably, an elongated, generally vertically extending shaft 74 is non-rotatably coupled with the lower arm 70 and extends through an opening in the lower wall of the housing 40 where it is rotatably received by a supporting bushing 76 fixedly coupled to the housing 40. The shaft 74 establishes a pivot axis for the bracket member 20 and for the gate member 14. The upper arm 70 of the bracket member is also rotatably coupled to the housing 20 by any suitable means such as a stub shaft extending from the upper arm 70 through the upper wall of the housing 40 concentric with the pivot axis.

A second shaft 76 is supported parallel with and spaced from shaft 74 and is fixedly coupled thereto by upper and lower arm members 78 and 80 to provide a generally U-shaped lever arm for rotating the shaft 74. The distal end of the piston arm 58 includes a clevis member 82 with a transverse bore which is received on the second shaft 76. The opposite end of the air cylinder 50 is secured to the housing 40 utilizing a second clevis arrangement 84. In this manner, the application of pressurized air or other fluid to the head side of the piston 56 results in movement of the piston 56 and piston arm 58 toward the left when viewing FIG. 4 causing the second shaft 76 and arm members 78, 80 to move. Movement of the second shaft 76 and arm members 78, 80 results in rotation of the shaft 74 and pivoting of the bracket member 20 from the position as shown in FIG. 4 in which the cross member 72 is generally parallel to the housing 40 to the extended position shown in FIG. 1 in which the cross member 72 and, correspondingly the gate member 14, is generally perpendicular to the housing 40 and the school bus bumper 18.

In the present embodiment, compressed air is provided to the air cylinder 50 by an air pressure adjusting means generally 90 which includes an electrically powered air compressor 92 within the housing 40, a fluid coupling 94 extending between the air compressor 92 and the air cylinder 50 and an electrically operated valve 96. The air compressor 92 is preferably a twelve volt portable air compressor available from a variety of manufacturers, for example, a HI-FLO 220 Compressor made by KP Industries of Delphos, Ohio. The air compressor 92 is powered by an electric motor 98 through suitable gears 100 that drive an eccentric 102 for reciprocal motion of a piston assembly 104 within the air compressor 92. Reciprocation of the piston assembly 104 causes pressurized air to flow out of the air compressor 92 through a suitable output coupling 96 which includes a mechanical check valve (not shown). The output coupling 96 is in fluid communication with generally cylindrical flexible tubing 108 to provide one-way flow of pressurized air from the air compressor 92 to the air cylinder 50. It will be appreciated that while the compressor 92 in the present embodiment is located within the housing 40, it could be located elsewhere, such as within the vehicle, or compressed air or other pressurized fluid could be obtained from some other source, such as from the vehicle's braking system.

The electrically operated valve 96 is installed within the tubing 108 between the air compressor 92 and the air cylinder 50 in order to control the flow of pressurized air to the air cylinder 50. The valve 96 can be any suitable type of valve from a variety of manufacturers, for example, a Model ETO-3-12 Minimatic Valve from Clippard Instrument Laboratory, Inc., Cincinnati, Ohio. When the valve 96 is in a first position, the air cylinder 50 and the tubing 108 are vented to prevent pressurized air from being applied to the air cylinder 50 and thereby preventing movement of the gate member 14. When the valve 96 is in a second position, the vent is blocked and the tubing 108 is in fluid communication with the air cylinder 50 so that compressed air from the air compressor 92 is provided to the head side of the piston 56 within the air cylinder 50. As the air pressure within the air cylinder 50 increases, the piston 50 moves toward the left when viewing the figures against the bias of the return spring 60 to correspondingly move the gate member 14 from the retracted position to the extended position as shown in FIG. 1. As indicated above, the valve 96 is electrically operated such that when a suitable electrical signal of a predetermined minimum voltage is applied to the valve 96, the valve actuates to the second position and when no electrical voltage is present, the valve 96 is in the first position. It will be appreciated that while the valve 96 in the present embodiment is located within the housing 40, it could be at some other location within the vehicle or bus 10, if desired.

A pressure actuated electrical switch 110 is also fluidly coupled with the tubing 108 between the air compressor 92 and the electrically operated valve 96. The pressure switch 110 is of a type well known in the art and generally commercially available from a variety of sources such as Model 9253 from Cole Hersee of Boston, Mass. The electrical connection between the motor 98 and electrical ground is controlled by the pressure switch 110. The pressure switch 110 operates by sensing the pressure within the tubing 108. As long as the pressure within the tubing 108 remains below a predetermined pressure limit, the electrical ground connection to the motor 98 is maintained. When the pressure within the tubing 108 exceeds the predetermined pressure limit, the pressure switch 110 is actuated to effectively break the electrical ground connection to the electric motor 98 thereby deactivating the electric motor 98 to effectively turn off the air compressor 92. Preferably, the predetermined pressure limit is established to be at least slightly greater than the maximum air pressure required to move the gate member 14 from its retracted position to its extended position and to maintain the gate member 14 in the extended position. In the presently preferred embodiment, the predetermined pressure limit is established at approximately 70 pounds per square inch although this setting may vary. It should be appreciated that while the pressure switch 110 in the present embodiment is located within the housing 40, it could be at some other location, such as within the bus 10, if desired.

As previously discussed, one advantage of the present invention is that it permits movement of the gate member 14 between a retracted position and an extended position utilizing a single electrical connection between the actuator 22 and the vehicle or school bus 10. The single electrical connection is supplied by a shielded electrical line 120 extending between the vehicle and a common electrical connection point 122 within the housing 40. Insulated electrical lines 124, 126 extend from the common electrical connection point 122 to the motor 98 and valve 96, respectively. The valve 96 is also electrically connected via electrical line 128 to a common ground lug 130 secured to the housing 40. Insulated line 132 extends from the ground side of the motor 98 to the pressure switch 110. A further line 134 extends from the other side of the pressure switch 110 to the common ground lug 130. In the presently preferred embodiment, a negative ground electrical system common to most motor vehicles is used although it will be appreciated by those skilled in the art that a positive ground system could be used in the alternative.

Figure 6:
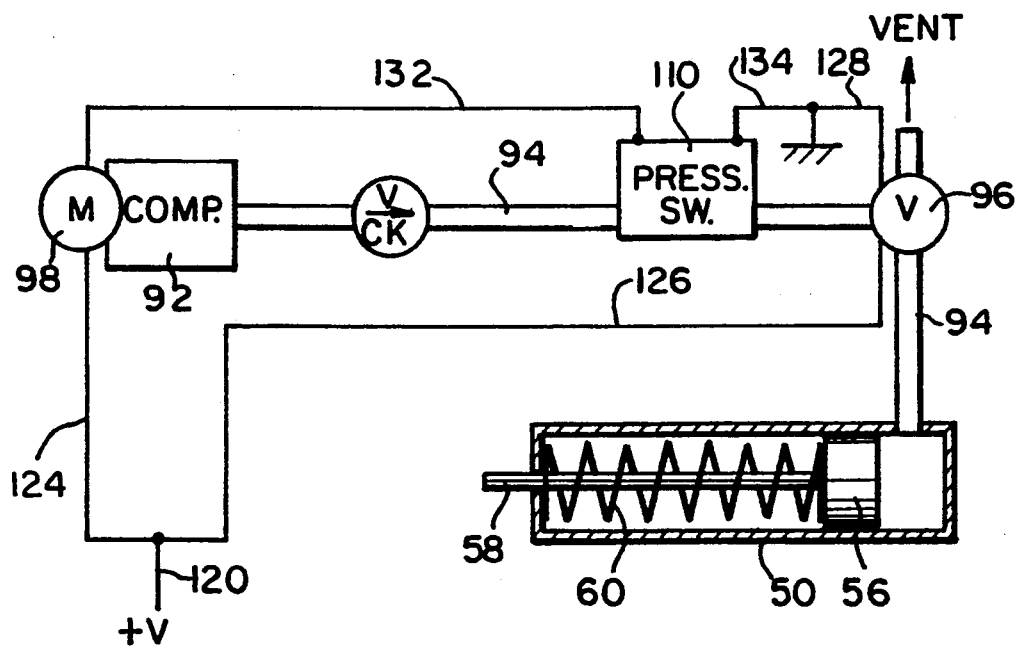
FIG. 6 is a functional schematic diagram illustrating the operation of the air and electrical systems shown in FIG. 4.

Operation of the actuator 22 will now be described utilizing the schematic of FIG. 6 which functionally illustrates both the fluid and electrical systems of the present embodiment. As discussed above, the gate member 14 is normally in the retracted position parallel to the school bus bumper 18 at any time when the school bus 10 is moving. When the gate member 14 is in the retracted position, no voltage is applied to the actuator 22 and the return spring 60 within the air cylinder 50 maintains the piston 56 in the position shown to effectively hold the gate member 14 in the retracted position. Since no voltage is applied to the actuator 22, the air compressor 92 is not operational so no compressed air is supplied to the fluid coupling 94. Similarly, the valve 96 is in its first position whereby the head side of the piston 56 and the fluid coupling 94 are vented to atmosphere.

When the school bus 10 stops to load or discharge passengers, a positive voltage signal in the form of a continuous voltage, generally positive twelve volts, is supplied to the actuator 22 along line 120. The voltage signal may be supplied by the driver actively depressing or flipping a switch (not shown) or the voltage signal may be supplied automatically when the driver activates the flashing lights at the top of the school bus 10 or when the driver opens the school bus door. The application of the positive voltage signal results in operation of the motor 98 to operate the air compressor 92 to provide a flow of compressed air through the fluid coupling 94. The voltage signal also causes the valve 96 to assume its second position thereby permitting the compressed air from the air compressor 92 to be supplied to the head side of the piston 56 within the air cylinder 50. As the pressure of the compressed air within the fluid coupling 94 and the air cylinder 50 increases, the piston 56 translates steadily toward the left against the bias of the spring 60 to pivot the gate member 14 to its extended position. When the gate member 14 is in the fully extended position and the piston 56 can no longer move to the left, the pressure within the fluid coupling 94 continues to increase as long as the compressor 92 continues to function. When the pressure within the fluid coupling 94 exceeds the predetermined pressure limit, the pressure switch 110 is actuated to cut off the motor 98 from the common ground lug 130 thereby effectively deactivating the motor 98 and stopping the operation of the air compressor 92. As long as the voltage signal is applied, the valve 96 remains in the second position and the check valve within the output coupling 106 of the air compressor 92 maintains a constant fluid pressure within the fluid coupling 94 to maintain the piston 56 in its leftmost position and therefore maintain the gate member 14 in its extended position.

When all passengers have been loaded onto or discharged from the school bus 10 and the school bus 10 is ready to move, the voltage signal is removed from the actuator 22 thereby causing the valve 96 to return to its first position. When the valve 96 is in its first position, the air pressure within the air cylinder 50 and the fluid coupling 94 is vented thereby permitting the spring 60 to move the piston 56 toward the right, resulting in the gate member 14 moving back to its retracted position parallel to the school bus bumper 18.

The actuator 22 as just described is preferably for pivoting a safety device such as the gate member 14 between a retracted position and an extended position. If the safety device with which the actuator 22 is used is a stop sign 12 having electric lights 16, it is also necessary to provide power to and control the on/off blinking of the lights 16. A conventional automotive flasher 140 is located within the housing 40. The flasher 140 is connected to the incoming voltage line 120 and to outgoing lines 142 which extend through the housing 40 for attachment to the stop sign lights 16. In this manner, when a voltage signal is applied along line 120, the flasher 140 functions to flash the stop sign light 16 on and off in a manner well known in the art.

Figure 7:
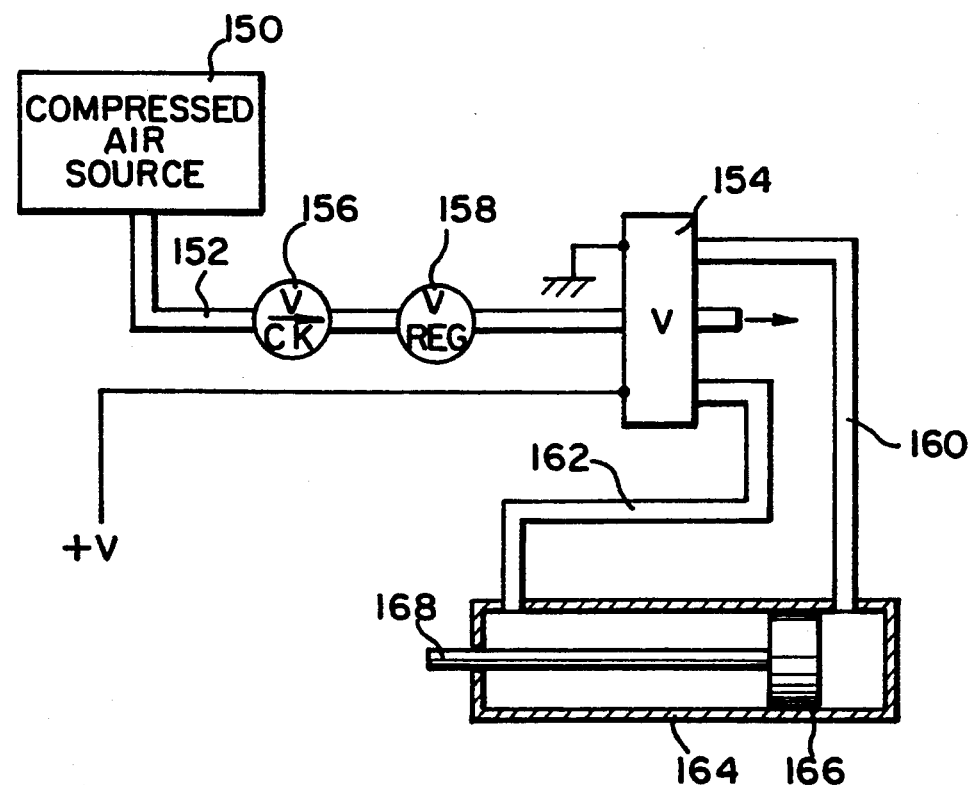
FIG. 7 is a functional schematic diagram of the air and electrical systems of an alternate embodiment of the structure of FIG. 4.

FIG. 7 is a schematic representation of an alternate embodiment of the actuator 22. In the alternate embodiment, an existing compressed air source 150, such as a tank associated with the air brakes of the school bus 10, is employed. Compressed air from the compressed air source 150 is supplied through a suitable fluid coupling 152 to an electrically operated valve 154. A check valve 156 and a pressure regulator 158 are incorporated into the fluid coupling 152 in order to maintain fluid pressure within the actuator and to prevent overpressure. The electrically operated valve 154, in addition to including an input port associated with the fluid coupling 152 includes two output ports, each of which is associated with a separate fluid line 160, 162. The fluid lines 160, 162 in turn are connected to an air cylinder 164 so that one of the fluid lines 160 is in fluid communication with the head side of a piston 166 and the other fluid line 162 is in fluid communication with the rod side of the piston 166. An arm 168 associated with the piston 166 extends out of the air cylinder 164 and functions to actuate the bracket member 20 in the same manner as the piston arm 58 associated with the air cylinder 50 of the embodiment shown in FIG. 4. The valve 154 is capable of assuming two positions. In a first position, compressed air from the fluid coupling 152 flows through the valve 154 and through fluid line 162 to the rod side of the piston 166 and fluid line 160 from the head side of the piston 166 is vented to atmosphere. Thus, when the valve is in the first position, pressurized air from the compressed air source 152 flows through the fluid coupling 152, through the valve 154, through the fluid line 162, and against the rod side of the piston 166 causing the piston 166 to move or remain toward the right of the air cylinder 164 when viewing FIG. 7. Upon the application of a positive voltage to the valve 154, the valve 154 actuates to the second position in which compressed air from the compressed air source 150 flows through fluid line 160 to the head side of the piston 166 and fluid line 162 on the rod side of the piston 166 is vented to atmosphere thereby causing the piston 166 to translate toward the left when viewing FIG. 7 and to thereby move the gate member 14 from its retracted position to its extended position. Because of a constant flow of compressed air from the compressed air source 150, the piston 166 is maintained toward the left, holding the gate member 14 in its extended position. When the voltage signal is removed, the valve 154 moves back to its first position thereby moving the piston 166 toward the right and retracting the gate member 14. Compressed air from the compressed air source 150 continuously flows through the fluid coupler 152, the valve 154, and the fluid line 162 to maintain the piston 166 in its rightmost position to thereby keep the gate member 14 in its retracted position until a voltage is again applied to the valve 154.

From the foregoing description, it can be seen that the present invention comprises a pivoting safety apparatus for moving a safety device between a retracted position and an extended position. It will be appreciated by those skilled in the art that various modifications, additions, and other changes may be made to the above-described embodiments of the invention without departing from the broad inventive concepts thereof. It should be understood, therefore, that this invention is not limited to the particular embodiments disclosed, but is intended to cover all modifications which are within the scope and spirit of the invention as defined by the appended claims.

I claim:

1. A pivoting safety apparatus for mounting on a motor vehicle comprising:
 a housing for mounting on the motor vehicle;
 a safety device pivotally coupled with the housing for movement about a pivot axis between a retracted position and an extended position;
 an actuator at least partially located within the housing, the actuator comprising an air cylinder having a piston arm extending from a piston within the air cylinder and coupled to the safety device for movement of the safety device about the pivot axis, the piston arm and the piston being movable in response to variations from atmospheric pressure of air within the air cylinder; and
 air pressure adjustment means comprising an electrically powered air compressor, a fluid coupling extending between the air compressor and the air cylinder and an electrically operated valve, the valve and the air compressor being wired together so that the application of a single electrical signal causes the air compressor to operate and the valve to actuate for altering the air pressure within the air cylinder from atmospheric pressure to move the piston, the piston arm and the safety device.

2. The pivoting safety apparatus as recited in claim 1 wherein the safety device comprises an elongated gate member.

3. The pivoting safety apparatus as recited in claim 2 wherein the gate member comprises an elongated channel which is generally U-shaped in cross-section.

4. The pivoting safety apparatus as recited in claim 2 wherein the housing is adapted for mounting on the front bumper of the motor vehicle so that the gate is generally parallel to the vehicle bumper in the retracted position and is generally perpendicular to the vehicle bumper in the extended position.

5. The pivoting safety apparatus as recited in claim 2 wherein a first end of the gate member is attached to the actuator and wherein the gate member further comprises an engagement means for removably engaging the vehicle to provide support for the gate member when in the retracted position.

6. The pivoting safety apparatus as recited in claim 5 wherein the engagement means comprises a first coupling member secured to the gate member and a second complementary coupling member secured to the vehicle.

7. The pivoting safety apparatus as recited in claim 1 further comprising a pressure sensor for sensing the air pressure within the air pressure adjustment means and for causing the air compressor to stop operating when a predetermined pressure is sensed.

8. The pivoting safety apparatus as recited in claim 7 wherein the predetermined pressure is established to be greater than the air pressure required to move the safety device from the retracted position to the extended position.

9. The pivoting safety apparatus as recited in claim 7 wherein the pressure sensor is in communication with the fluid coupling.

10. The pivoting safety apparatus as recited in claim 7 wherein the safety device comprises an elongated gate member.

11. The pivoting safety apparatus as recited in claim 10 wherein the gate member comprises an elongated channel which is generally U-shaped in cross-section.

12. The pivoting safety apparatus as recited in claim 10 wherein the housing is adapted for mounting on the front bumper of the motor vehicle so that the gate is generally parallel to the vehicle bumper in the retracted position and is generally perpendicular to the vehicle bumper in the extended position.

13. The pivoting safety apparatus as recited in claim 7 wherein the safety device comprises a sign.

14. The pivoting safety apparatus as recited in claim 13 wherein the sign includes an electric light powered by the single electrical signal and a flasher for flashing the light on and off when the electrical signal is present.

15. A pivoting safety apparatus for mounting on a motor vehicle comprising:
   a housing for mounting on the motor vehicle having a source of compressed air;
   a safety device pivotally coupled with the housing for movement about a pivot axis between a retracted position and an extended position;
   an actuator at least partially located within the housing, the actuator comprising an air cylinder having a piston arm extending from a piston within the air cylinder and coupled to the safety device for movement of the safety device about the pivot axis, the piston arm and the piston being movable in response to variations from atmospheric pressure of air within the air cylinder; and
   air pressure adjustment means comprising a fluid coupling extending between the compressed air source and the air cylinder and an electrically operated valve connected between the compressed air source and the air cylinder, the valve actuating in response to the application of a single electrical signal to cause compressed air to be applied to a first side of the piston to move the piston, piston arm and safety device to the extended position and actuating in response of removal of an electrical signal to cause compressed air to be applied to a second side of the piston to move the piston, piston arm and safety device to the retracted position.

16. The pivoting safety apparatus as recited in claim 15 wherein the air pressure adjusting means further comprises a check valve and a pressure regulator connected between the compressed air source and the valve.

17. The pivoting safety apparatus as recited in claim 15 wherein the valve includes a vent for venting the side of the piston on which compressed air is not being applied.

18. The pivoting safety apparatus as recited in claim 15 wherein the safety device comprises an elongated gate member.

19. The pivoting safety apparatus as recited in claim 18 wherein the gate member comprises an elongated channel which is generally U-shaped in cross-section.

20. The pivoting safety apparatus as recited in claim 18 wherein the housing is adapted for mounting on the front bumper of the motor vehicle so that the gate is generally parallel to the vehicle bumper in the retracted position and is generally perpendicular to the vehicle bumper in the extended position.

* * * * *